(12) United States Patent
Nakui (10) Patent No.: US 11,366,367 B2
(45) Date of Patent: Jun. 21, 2022

(54) DISPLAY DEVICE AND INSPECTION METHOD OF DISPLAY DEVICE

(71) Applicant: SHARP KABUSHIKI KAISHA, Sakai (JP)

(72) Inventor: Masanao Nakui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/405,322

(22) Filed: Aug. 18, 2021

(65) Prior Publication Data

US 2022/0057683 A1 Feb. 24, 2022

Related U.S. Application Data

(60) Provisional application No. 63/068,696, filed on Aug. 21, 2020.

(51) Int. Cl.
*G02F 1/1362* (2006.01)

(52) U.S. Cl.
CPC .. *G02F 1/136286* (2013.01); *G02F 1/136254* (2021.01)

(58) Field of Classification Search
CPC .................................................. G02F 1/136286
See application file for complete search history.

(56) References Cited

U.S. PATENT DOCUMENTS

2017/0351151 A1\* 12/2017 Nakagawa ............ G02F 1/1309
2019/0354219 A1\* 11/2019 Chang ............... H01L 23/49816

FOREIGN PATENT DOCUMENTS

JP 2005-216816 A 8/2005

\* cited by examiner

*Primary Examiner* — Edmond C Lau
(74) *Attorney, Agent, or Firm* — ScienBiziP, P.C.

(57) ABSTRACT

A display device includes: a first substrate having a display area and a frame area; a second substrate facing the display area; a conductive layer disposed on the second substrate; electrode portions disposed in the frame area; joints corresponding one-to-one to the electrode portions; and a wire connecting the electrode portions together in series. Each of the electrode portions includes a first electrode and a second electrode. Each of the joints includes a first conductive portion and a second conductive portion, the first conductive portion electrically connecting together the conductive layer and the first electrode, the second conductive portion electrically connecting together the conductive layer and the second electrode. Between two of the electrode portions adjacent to each other, the wire connects together the first electrode of one of the two electrode portions and the second electrode of another of the two electrode portions.

12 Claims, 9 Drawing Sheets

DISPLAY DEVICE AND INSPECTION METHOD OF DISPLAY DEVICE

CROSS-REFERENCE TO RELATED APPLICATION

The present application claims priority from Provisional Application 63/068,696, the content to which is hereby incorporated by reference into this application.

BACKGROUND OF THE INVENTION

1. Field of the Invention

The disclosure relates to a display device and a method of inspecting the display device.

2. Description of the Related Art

Japanese Patent Application Laid-Open No. 2005-216816 for instance discloses an apparatus for inspecting a display panel that has a plurality of first contractors and a second contractor. The first contractors are in contact with a plurality of metal backs located on the inner surface of the display panel. The second contractor is in contact with a frame-shaped conductive film surrounding the metal backs without contact. Also disclosed is a method of inspecting the display panel. The method includes applying a potential difference between the first contractors and second contractor, detecting the voltage of resistors, provided for the respective first contractors, and measuring the value of resistance between each metal back and the conductive film.

SUMMARY

However, the apparatus for inspecting the display panel and the method of inspecting the display panel described in Japanese Patent Application Laid-Open No. 2005-216816 require as many terminals for measuring the resistance value as the number of first contractors. More terminals are thus required along with increase in the number of inspection-target locations in the display panel. This unfortunately increases costs necessary for the inspection.

It is an object of one preferred embodiment of the present invention to achieve a reduced number of terminals and a reduced cost necessary for inspection in a display device and in a method for inspecting the display device.

Solution to Problem (1) A display device in the disclosure includes the following: a first substrate having a display area and a frame area disposed around the display area; a second substrate facing the display area; a conductive layer disposed on the second substrate and remote from the first substrate; a plurality of electrode portions disposed in the frame area; a plurality of joints corresponding one-to-one to the plurality of electrode portions; and a wire connecting, between both of ends of the wire, the plurality of electrode portions together in series. Each of the plurality of electrode portions includes a first electrode and a second electrode. Each of the plurality of joints includes a first conductive portion and a second conductive portion. The first conductive portion electrically connects together the conductive layer and the first electrode of corresponding one of the plurality of electrode portions. The second conductive portion electrically connects together the conductive layer and the second electrode of the corresponding electrode portion. Between two of the plurality of electrode portions adjacent to each other, the wire connects together the first electrode of one of the two electrode portions and the second electrode of the other of the two electrode portions.

(2) In the display device according to aspect (1), the wire has a lower degree of electrical resistivity than the conductive layer.

(3) In the display device according to aspect (1) or (2), the first conductive portion and the second conductive portion are made of a conductive material, the first conductive portion continuously extends from the conductive layer to the first electrode, and the second conductive portion continuously extends from the conductive layer to the second electrode.

(4) In the display device according to aspect (3), each of the plurality of joints is made of the conductive material, and each of the plurality of joints further includes a third conductive portion electrically connecting the first and second conductive portions together on the conductive layer.

(5) In the display device according to aspect (4), each of the plurality of joints has a U-shape in a top view.

(6) The display device according to any of aspects (1) to (5) further includes a liquid crystal layer disposed between the first substrate and the second substrate.

(7) The display device according to any of aspects (1) to (6) further includes a circuit board connected to the first substrate. The circuit board has a grounding portion and a terminal portion including first and second terminals. The wire is connected to the first terminal and the second terminal at both of the respective ends and is connected to the grounding portion.

(8) The display device according to aspect (7) further includes a flexible board flexible and connecting together the first substrate and the circuit board. The wire includes a wire disposed on the flexible board. The wire disposed on the first substrate and the circuit board is connected via the wire disposed on the flexible board.

(9) in the display device according to aspect (7) or (8), between two of the plurality of electrode portions adjacent to each other, the wire is routed from the frame area up to the circuit board and from the circuit board back to the frame area.

(10) A method of inspecting the display device according to any of aspects (1) to (9) includes the following: measuring a resistance value between both of the ends of the wire; and in response to the resistance value that is equal to or greater than a predetermined value, determining that one of the plurality of joints and corresponding one of the plurality of electrode portions establish a faulty connection.

(11) A method of inspecting the display device according to any of aspects (7) to (9) includes the following: connecting an inspection power source to the first terminal; connecting, to the second terminal, an inspection light source that is lit upon application of a voltage equal to or greater than a threshold voltage; and applying a voltage to the inspection power source in such a manner that, for a resistance value between the first and second terminals that exceeds a reference value, the voltage applied to the inspection light source is less than the threshold voltage, and in such a manner that, for the resistance value that is equal to or smaller than the reference value, the voltage applied to the inspection light source is equal to or greater than the threshold voltage.

(12) The method according to aspect (11) includes connecting a variable resistor in parallel to the inspection light source; and regulating a resistance value of the variable resistor to change the reference value established for the resistance value.

Advantageous Effect of Disclosure

The aspects of the present invention achieves a reduced number of terminals and a reduced cost even through there are many inspection-target locations in the inspection of the display device.

DETAILED DESCRIPTION

Illustrative preferred embodiments of the present invention will be described with reference to the drawings. Some of the drawings provide X-, Y-, and Z-axes, the directions of which are drawn so as to coincide with directions provided in each drawing. Some of the drawings also illustrate a liquid crystal panel, the top of which is on its second substrate (CF substrate), and the bottom of which is on its first substrate (array substrate). These directional definitions are provided for merely convenience in description and are thus not intended to limit orientations during the use and inspection of the display device according to the present invention. Moreover, similar components throughout the drawings are denoted by the same signs and will not be elaborated upon.

First Preferred Embodiment

Figure 1:
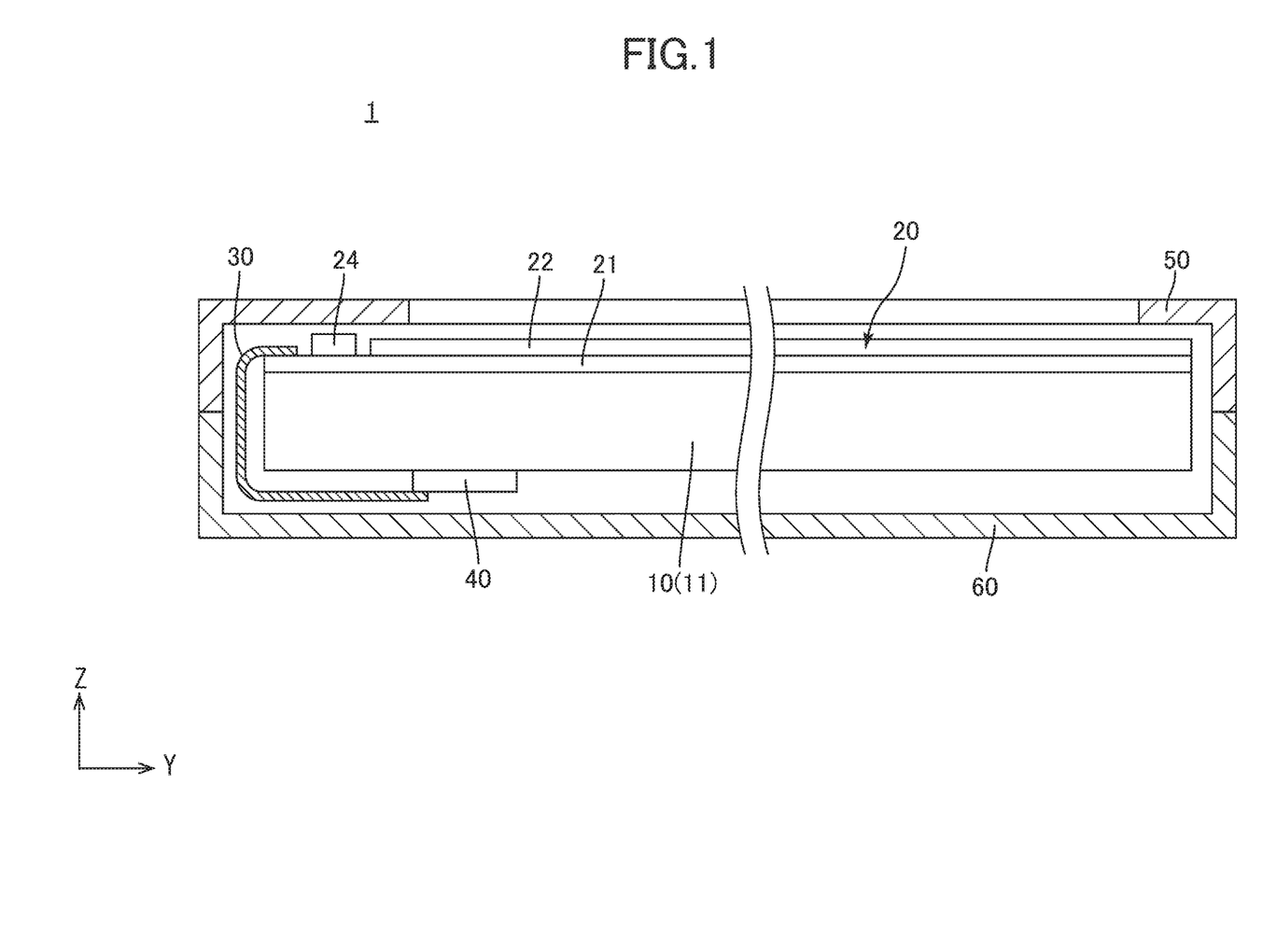
FIG. 1 is a schematic sectional view of the configuration of a display device according to a first preferred embodiment.
Figure 2:
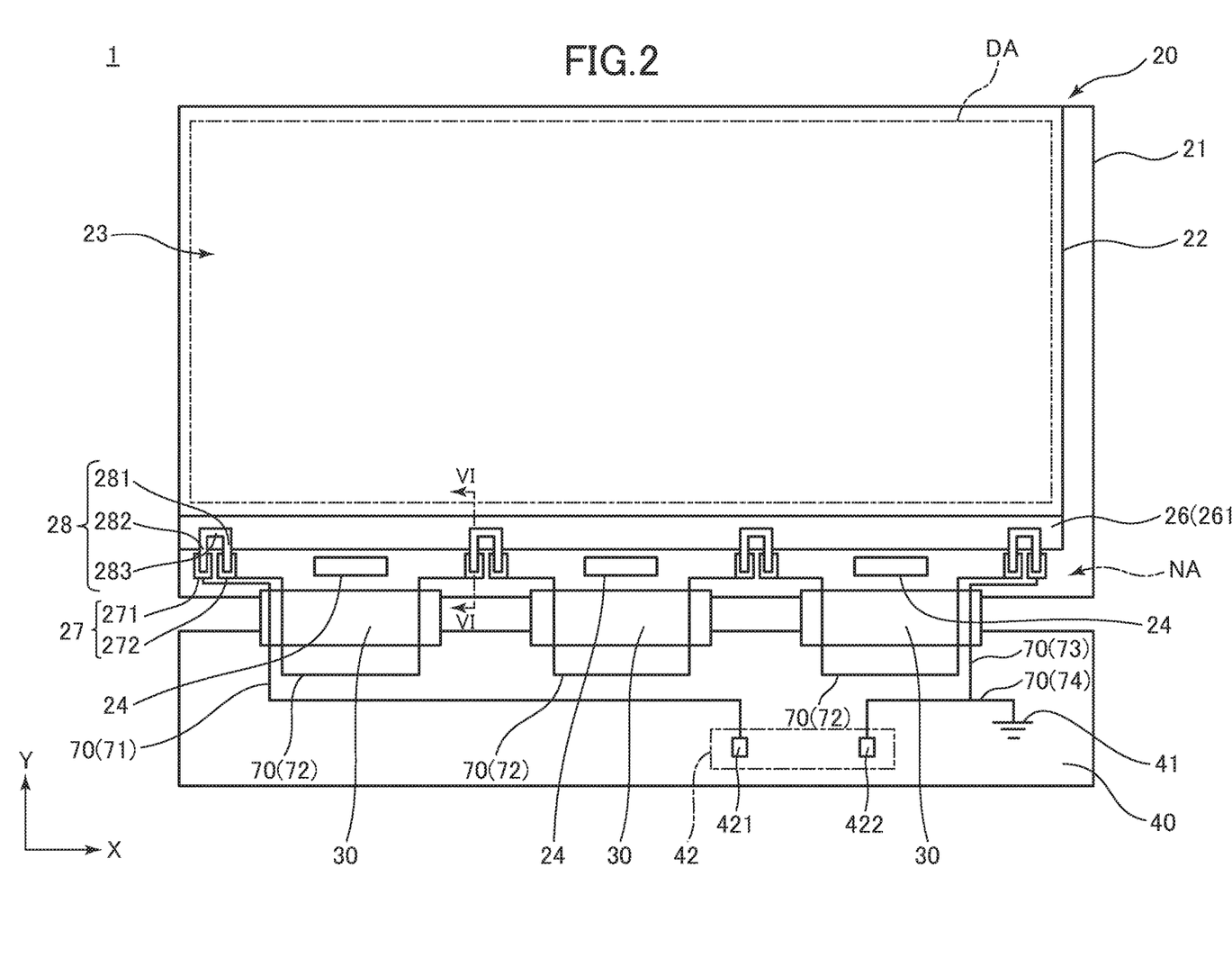
FIG. 2 is a top view of the configuration of how a liquid crystal panel, flexible boards, and a circuit board, all included in the display device according to the first preferred embodiment, are connected together.

FIG. 1 is a schematic sectional view of the configuration of a display device 1 according to this preferred embodiment. FIG. 2 is a top view of the configuration of how a liquid crystal panel 20, flexible boards 30, and a circuit board 40, all included in the display device 1 according to this preferred embodiment, are connected together.

The display device 1 in this preferred embodiment is a liquid crystal display that regulates, with the liquid crystal panel 20, light emitted from a backlight 10, to thus display an image. As illustrated in FIG. 1, the display device 1 in this preferred embodiment includes the backlight 10, the liquid crystal panel 20, the flexible boards 30, and the circuit board 40. The display device 1 in this preferred embodiment also include a bezel 50 and a casing 60 both accommodating and holding the liquid crystal panel 20 and backlight 10. In the liquid crystal panel 20, the bezel 50 surrounds a display area DA, where an image is displayed. The casing 60 is a shallow box having an opening on its top.

The backlight 10 emits light to the liquid crystal panel 20. The backlight 10 in this preferred embodiment has a chassis 11, a light source (now shown), and an optical member (not shown), The chassis 11 is a box accommodating the light source. The light source is composed of, for instance, a cold-cathode tube, a light emitting diode (LED), or an organic electroluminescence (EL) element. The chassis 11 has an opening on its top. The optical member covers the opening and converts light emitted from the light source into planar light. The optical member is composed of, for instance, a diffusion film or a reflective film.

The liquid crystal panel 20 controls the passage and non-passage of light emitted from the backlight 10. As illustrated in HG. 2, the liquid crystal panel 20 in this preferred embodiment has a first substrate 21, a second substrate 22, a liquid crystal layer 23, and drivers 24.

The first substrate 21 is disposed above the backlight 10. The first substrate 21 in this preferred embodiment is an array substrate (wiring substrate, active-matrix substrate) 21 with thin-film transistors (TFTs) and various wires, described later on, mounted thereon. The first substrate 22 is disposed above the array substrate 21 so as to face the array substrate 21. The second substrate 22 in this preferred embodiment is a CF substrate (counter substrate) 22 with a color filter and a black matrix, both described later on, mounted thereon. The array substrate 21 and the CF substrate 22 are made of, tier instance, glass that is transparent to light.

The liquid crystal layer 23 is disposed between the array substrate 21 and CF substrate 22. The liquid crystal layer 23 contains liquid crystal molecules, the optical properties of which are changed by application of an electric field. The liquid crystal layer 23 is surrounded by a seal portion (not shown) between the array substrate 21 and CF substrate 22. The seal portion joins the array substrate 21 and CF substrate 22 together with as large an interval as the thickness of the liquid crystal layer 23 being maintained. The seal portion is made of a photo-curable resin, such as a UV-curable resin.

As illustrated in FIG. 2, the array substrate 21 in this preferred embodiment has a middle part where the display area DA, used for image display in the display device 1, extends. The array substrate 21 also has a perimeter area surrounding the display area DA. The perimeter area is a non-display area (frame area NA), where an image is not displayed in the display device 1. The array substrate 21 in this preferred embodiment is larger than the CF substrate 22. The drivers (panel drivers) 24, used for supplying various signals relating to display function, and the flexible boards 30 are mounted on the frame area NA that is located outside the CF substrate 22 in a top view.

Each driver 24 is composed of an LSI chip incorporating a drive circuit for instance. The driver 24 is mounted on the frame area NA through chip-on-glass (COG) and processes various signals transmitted from the circuit board 40. Each driver 24 in this preferred embodiment is disposed in the frame area NA of the array substrate 21 in the Y-axis direction and is connected to the circuit board 40 with the corresponding flexible board 30 interposed therebetween.

Each flexible board 30 is composed of a base made of an insulating and flexible synthetic resin (e.g., polyimide resin) for instance and having many wire patterns (not shown) mounted on the base. Each flexible board 30 in this preferred embodiment has one end connected to the frame area NA of the array substrate 21 in the y-axis direction, as illustrated in FIG. 2. The flexible board 30 has the other end connected to the circuit board 40, which is a source of signal supply. Various signals supplied from the circuit board 40 are transmitted to the array substrate 21 via the flexible boards 30, processed by the drivers 24 in the frame area NA and then output to the display area DA.

The circuit board 40 in this preferred embodiment is disposed under the chassis 11, as illustrated in FIG. 1. Moreover, the circuit board 40 and each driver 24 are connected together by the corresponding flexible board 30 bent to be folded back. Using the flexible boards 30 in this way can enhance flexibility in the arrangement of the circuit board 40. The circuit board 40 in this preferred embodiment has the following: a grounding portion 41 connected to a ground to be maintained at a ground potential; and a connector (terminal portion) 42 having a first terminal 421 and a second terminal 422 both connectable to an external connector (not shown). The grounding portion 41 and the connector 42 are connected to a wire 70, which will be described later on.

Figure 3:
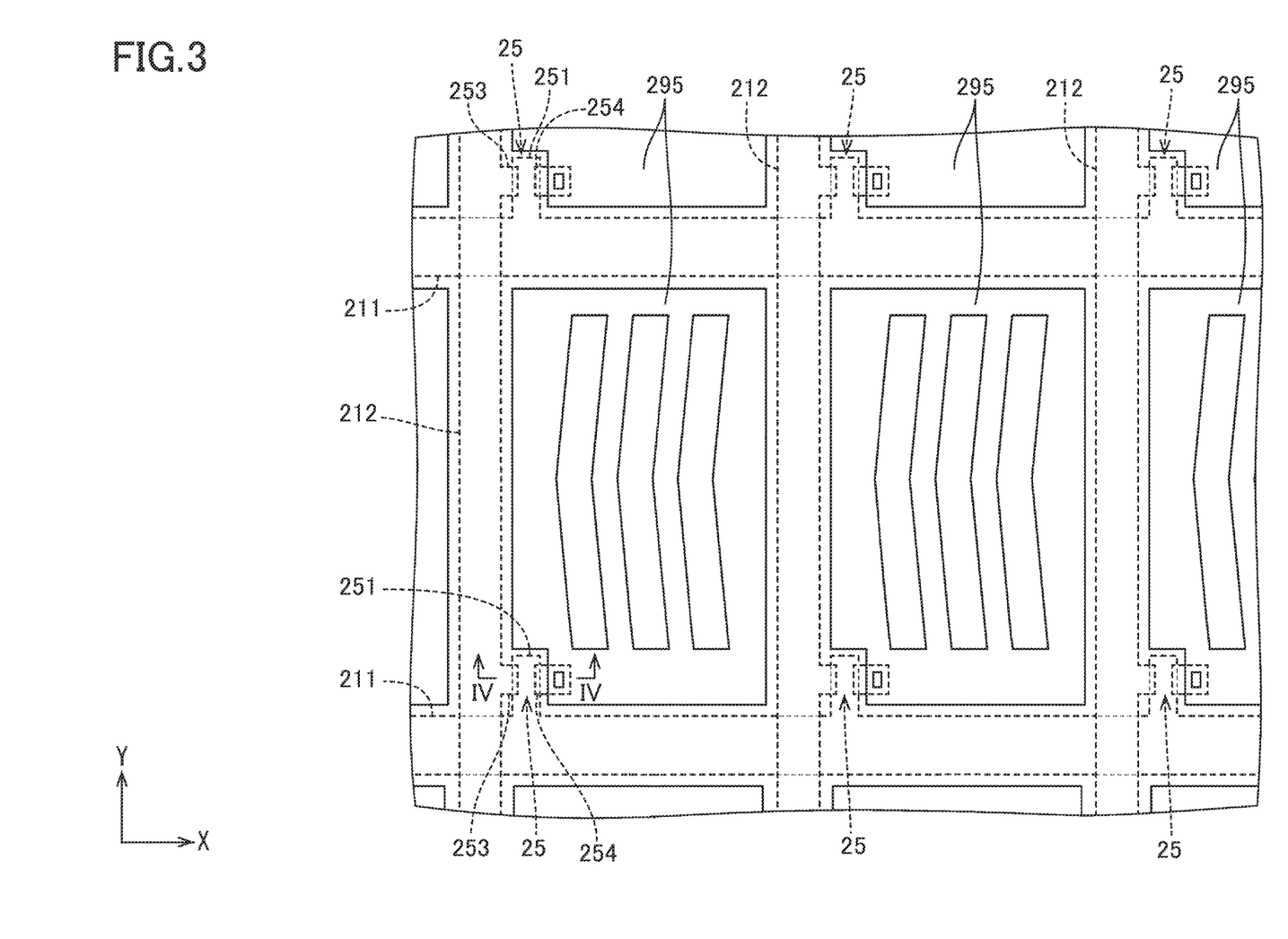
FIG. 3 is a schematic partial top view of the configuration of the liquid crystal panel in its display area according to the first preferred embodiment.
Figure 4:
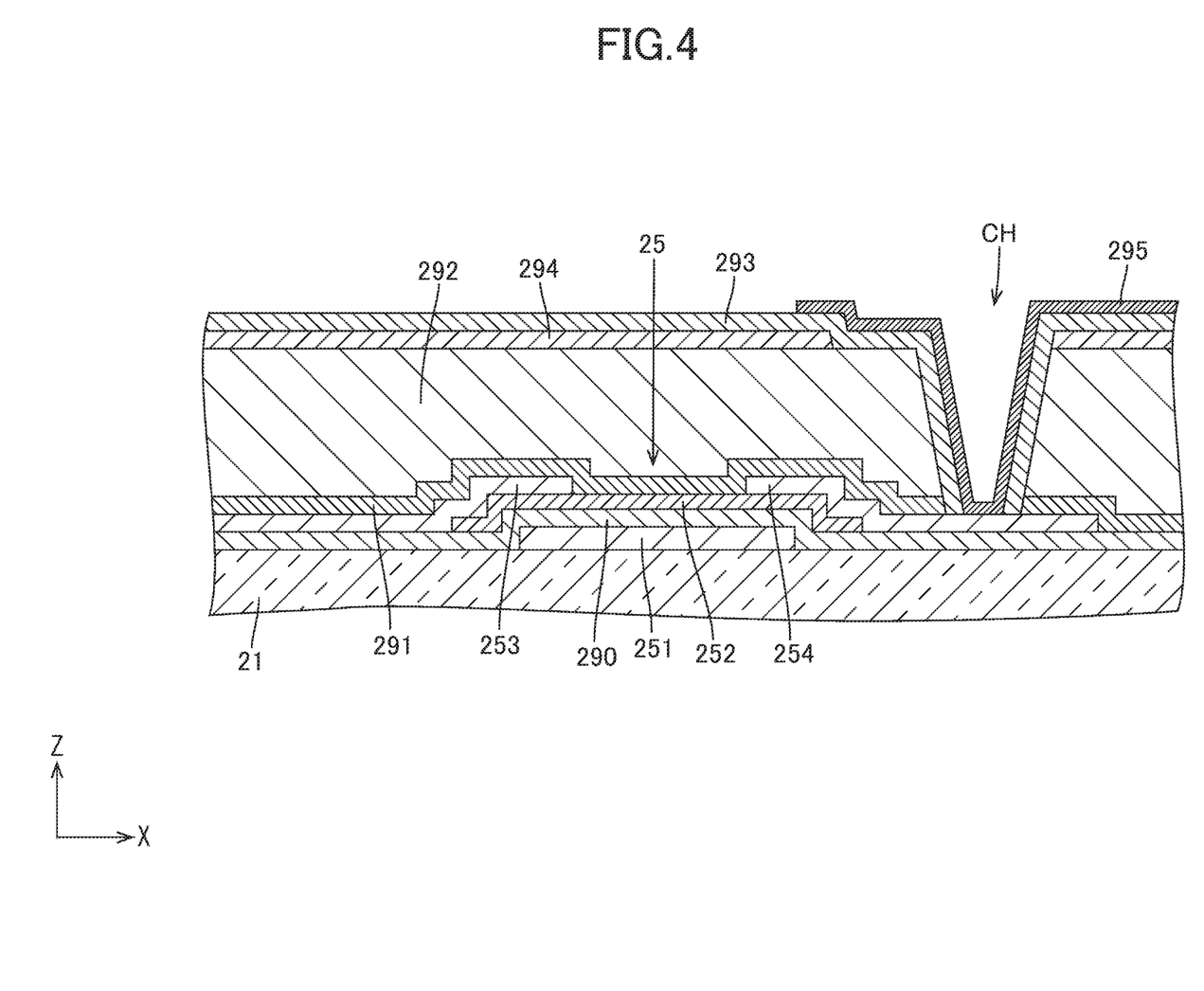
FIG. 4 is a schematic sectional view of the configuration near a TFT according to the first preferred embodiment.
Figure 5:
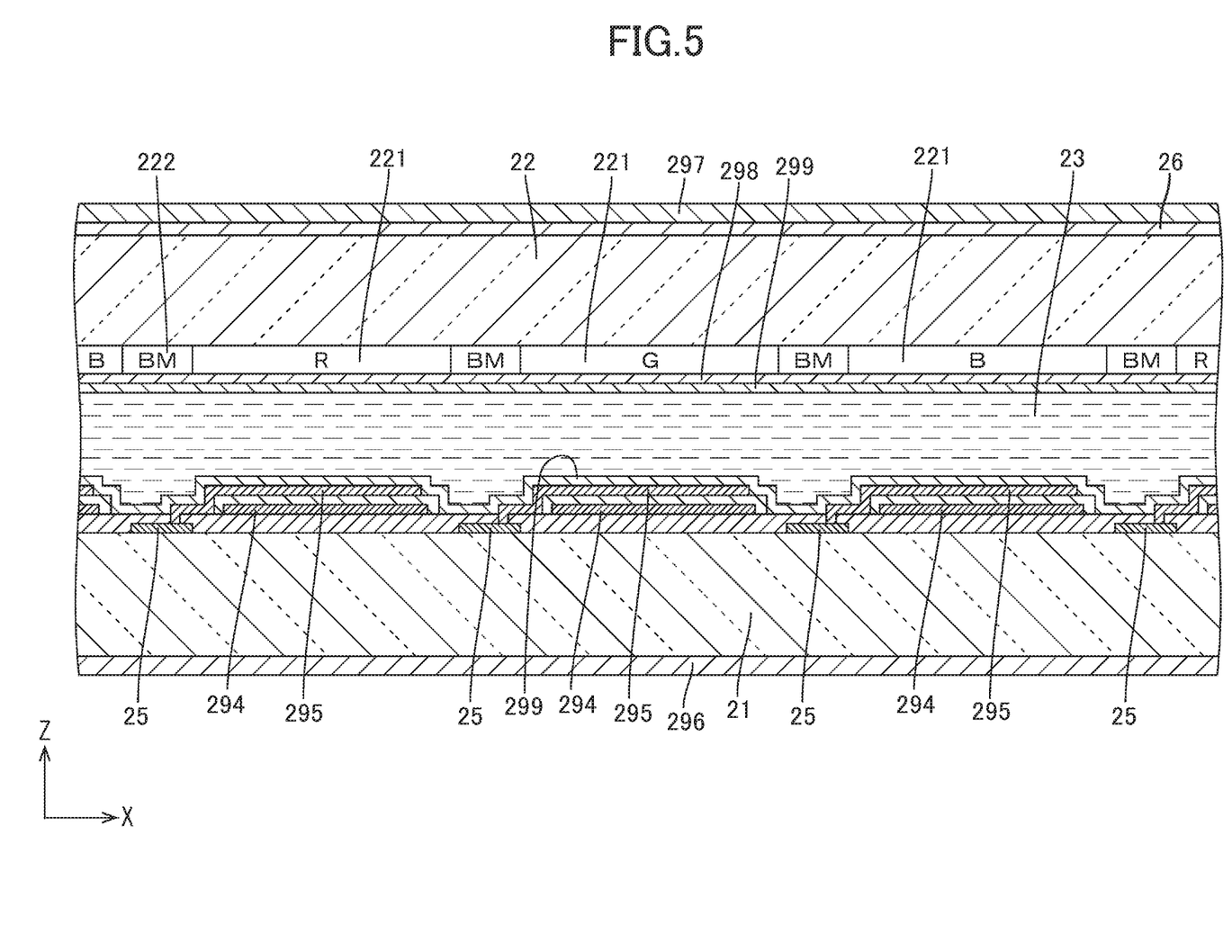
FIG. 5 is a schematic sectional view of the configuration of the liquid crystal panel in its display area according to the first preferred embodiment.

Next, the configuration of the liquid crystal panel 20 in the display area DA according to this preferred embodiment will be described. FIG. 3 is a schematic partial top view of the configuration of the liquid crystal panel 20 in the display area DA according to this preferred embodiment. FIG. 4 is a sectional view taken along IV-IV in FIG. 3. FIG. 5 is a schematic sectional view of the configuration of the liquid crystal panel 20 in the display area. DA according to this preferred embodiment.

The array substrate 21 in this preferred embodiment has a plurality of gate wires 211 (scan lines) and a plurality of source wires 212 (signal line, data line) all mounted thereon, as illustrated in FIG. 3. The gate wires 211 extend across the display area DA in the X-axis direction. The source wires 212 extend across the display area DA in the Y-axis direction, where the source wires 212 intersect with the gate wires 211. Each of the gate wires 211 and source wires 212 has one end connected to the driver 24.

Disposed near the intersections between the gate wires 211 and source wires 212 are TFTs 25, which are switching elements, and pixel electrodes 295. Each gate wire 211 is connected to a gate electrode 251 of the corresponding TFT 25, Each source wire 212 is connected to a source electrode 253 of the corresponding TFT 25. Each pixel electrode 295 has a plurality of slits extending in parallel with each other in a top view.

Each TFT 25 in this preferred embodiment includes the gate electrode 251, a semiconductor layer 252, the source electrode 253, and a drain electrode 254, as illustrated in FIG. 4. The gate electrode 251 and the gate wire 211 are disposed on the array substrate 21. The gate electrode 251 is composed of a part of the gate wire 211, and the gate electrode 251 and the gate wire 211 are connected together. The gate electrode 251 and gate wire 211 are composed of, for instance, a stack of a titanium (Ti)-containing metal film on the bottom and a copper (Cu)-containing metal film on the top.

Disposed on the gate electrode 251 is a gate insulating film 290. The gate insulating film 290 is composed of an inorganic insulating film including, for instance, silicon oxide ($SiO_x$), silicon nitride ($SiN_x$), silicon oxide nitride ($SiO_xN_y$, where x>y), or silicon nitride oxide ($SiN_xO_y$, where x>y).

The semiconductor layer 252 overlaps the gate electrode 251 in a top view on the gate insulating film 290. The semiconductor layer 252 is made of oxide semiconductor for instance. Examples of the oxide semiconductor usable herein include $InGaO_3(ZnO)_5$, magnesium zinc oxide ($Mg_xZn_yO$), cadmium zinc oxide ($Cd_xZn_yO$), cadmium oxide (CdO), and amorphous oxide semiconductor containing a predetermined ratio of indium (In), gallium (Ga) and zinc (Zn). Using such oxide semiconductor as the semiconductor layer 252 can increase electron mobility by about 20 to 50 times higher than using, for instance amorphous silicon as the semiconductor layer 252.

The source electrode 253 and the drain electrode 254 are disposed in the same layer, That is, the source electrode 253 and the drain electrode 254 are formed in the same process step. The source electrode 253 and drain electrode 254 in this preferred embodiment are in contact with part of the semiconductor layer 252 on the gate insulating film 290, The source electrode 253 is composed of a part of the source wire 212, and the source electrode 253 and the source wire 212 are connected together. The source electrode 253 and the drain electrode 254 are composed of, for instance, a 3-ply stack of a molybdenum nitride (MoN)-containing metal film, an aluminum (Al)-containing metal film and a titanium (Ti)-containing metal film in sequence from the bottom.

Disposed over the semiconductor layer 252, the source electrode 253 and the drain electrode 254 is a first insulating film 291, The first insulating film 291 is composed of an inorganic insulating film containing silicon nitride ($SiN_x$) for instance. Disposed on the first insulating film 291 is a second insulating film 292. The second insulating film 292 is made of a transparent resin, such as acrylic resin, siloxane resin, or polyimide resin. An opening disposed in the first insulating film 291 and an opening disposed in the second insulating film 292 constitute a contact hole CH. The second insulating film 292 in this preferred embodiment serves also as a flattening film covering and thus flattening the asperities on the upper surface of the array substrate 21.

Disposed on the second insulating film 292 is a common electrode 294 not overlapping the contact hole CH in a top view. Disposed on the common electrode 294 is a third insulating film (interlayer insulating film) 293, Moreover, the foregoing pixel electrode 295 is disposed on the common electrode 294. To be specific, the third insulating film 293 continuously covers the common electrode 294 and the surface of the second insulating film 292. In addition, the pixel electrode 295 is disposed on the third insulating film 293 and overlaps, in a top view, part of the common electrode 294 and the contact hole CH, The pixel electrode 295 and the drain electrode 254 are thus electrically connected together via the contact hole CH. The common electrode 294 and the pixel electrode 295 are composed of a transparent conductive film containing indium tin oxide (ITO) or zinc oxide (ZnO) for instance. Moreover, the third insulating film 293 is composed of an inorganic insulating film containing silicon nitride ($SiN_x$) for instance.

The TFTs 25 in this preferred embodiment are bottom-gate TFTs each having the gate electrode 251 disposed under the semiconductor layer 252. In some preferred embodiments, the TFTs 25 may be top-gate TFTs each having the gate electrode 251 disposed over the semiconductor layer 252 or may be double-gate TFTs each having the gate electrode 251 disposed both over and under the semiconductor layer 252.

As illustrated in FIG. 5, the CF substrate 22 has a lower surface on which a color filter 221, which includes colored films of three colors: red (R), green (G) and blue (B), and a black matrix (light-blocking film) 222, which is provided for avoiding color mixture, are disposed. The color filter 221 is provided in matrix so as to overlap the pixel electrodes 295 in a top view. The black matrix 222 is provided in a lattice form so as to overlap the gate wires 211 and source wires 212 in a top view.

Disposed under the array substrate 21 is a polarizer plate 296, and disposed over the CF substrate 22 is a polarizer plate 297. The polarizer plates 296 and 297 are arranged in a crossed nicols manner, in which their polarization axes are orthogonal to each other. The surfaces of the color filter 221 and black matrix 222 are provided with an overcoat film 298. Each of the lower surface of the CF substrate 22 and the upper surface of the array substrate 21 is provided with an alignment film 299, provided for aligning the liquid crystal molecules contained in the liquid crystal layer 23. In the liquid crystal panel 20 in this preferred embodiment, colored films of three colors R, G and B of the color filter 221 and three pixel electrodes 295 overlapping these colored films in a top view constitute a single display pixel, which is a unit of display.

Each pixel electrode 295 is set at a potential conforming to a data signal supplied via the 110 corresponding TFT 25 and generates a fringe electric field, rotating the liquid crystal molecules, between the pixel electrode 295 and common electrode 294. The fringe electric field changes the retardation of the liquid crystal layer 23. This controls the transmission and non-transmission of light in the liquid crystal layer 23. In this way, an example of the liquid crystal panel 20 in this preferred embodiment is a liquid crystal panel that operates in fringe-field-switching (FFS) mode.

The following describes how the wire 70 is connected in the liquid crystal panel 20 according to this preferred embodiment. The liquid crystal panel 20 in this preferred embodiment further includes a conductive layer 26, electrode portions 27, joints 28, and the wire 70, as illustrated in FIG. 2.

The conductive layer 26 is disposed on the CF substrate 22 and is remote from the array substrate 21. To be specific, the conductive layer 26 continuously (in a flat manner) extend almost all across the upper surface of the CF substrate 22. The conductive layer 26 is composed of a transparent conductive film of ITO or ZnO for instance. The conductive layer 26 in this preferred embodiment has an exposed portion 261 not overlapping the polarizer plate 297 in a top view, as illustrated in FIG. 2. In this top view, the exposed portion 261 in this preferred embodiment extends at an end located in the Y-axis direction (in the direction where the flexible boards 30 are disposed) and extends in the form of a strip in the X-axis direction.

The plurality of electrode portions 27 are arranged in the frame area NA. Each electrode portion 27 includes a first electrode 271 and a second electrode 272. As illustrated in FIG. 2, this preferred embodiment provides four electrode portions 27 arranged in the X-axis direction in the frame area NA. In addition, the first electrode 271 and second electrode 272 of each of the four electrode portions 27 are arranged in this order in the X-axis direction. That is, the first electrode 271 and the second electrode 272 are arranged alternately in the X-axis direction. One of the first electrode 271 and second electrode 272 serves as a positive electrode, and the other serves as a negative electrode. The electrode portions 27 are composed of, for instance, a metal film or transparent electrode film formed through photolithography.

The joints 28 are made of a conductive material and connect together the conductive layer 26 and the electrode portions 27. The joints 28 are provided so as to correspond one-to-one to the electrode portions 27. To be specific, this preferred embodiment provides four joints 28, and each of the four joints 28 electrically connects together the conductive layer 26 and the corresponding electrode portion 27, as illustrated in FIG. 2. In addition, each of the four joints 28 includes a first conductive portion 281 and a second conductive portion 282. The first conductive portion 281 electrically connects together the first electrode 271 and the conductive layer 26. The second conductive portion 282 electrically connects together the second electrode 272 and the conductive layer 26.

Figure 6:
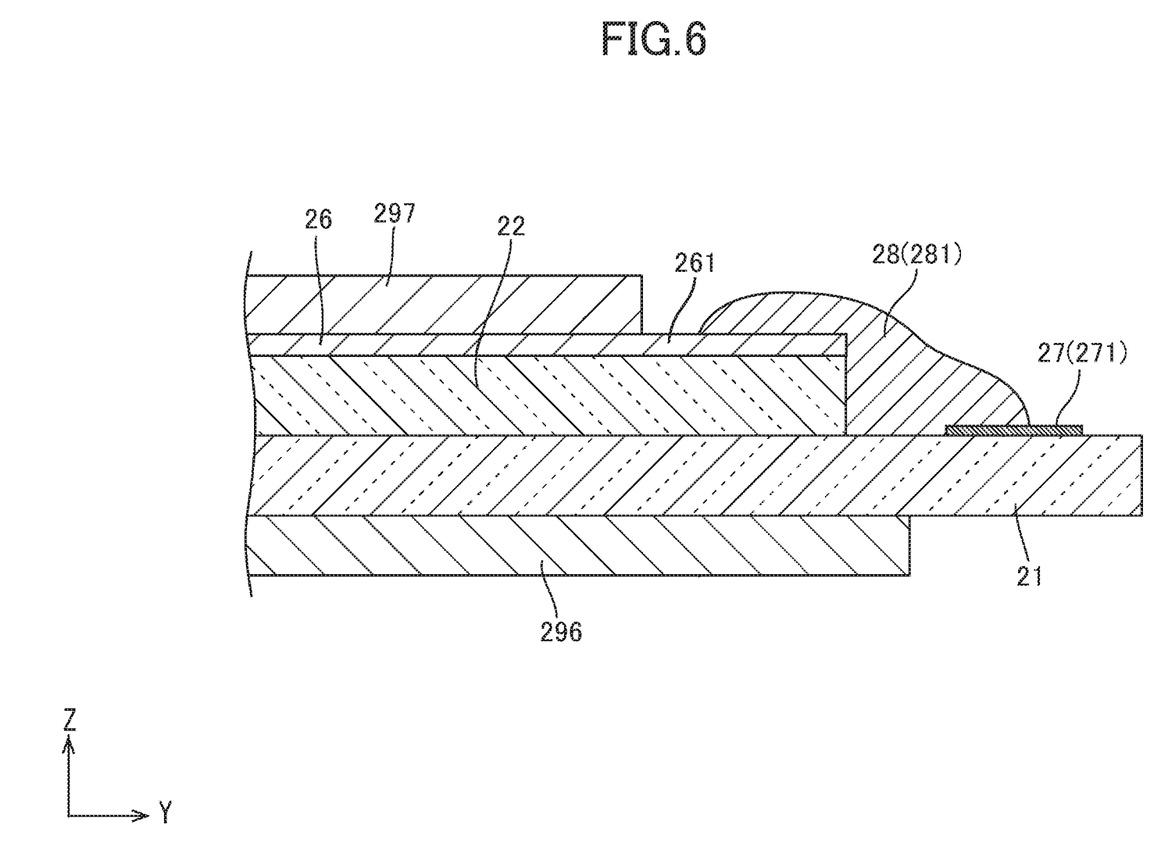
FIG. 6 is a sectional view of the configuration of how a conductive layer and an electrode portion are connected together by a joint according to the first preferred embodiment.

FIG. 6 is a sectional view taken along VI-VI in FIG. 2. Each first conductive portion 281 in this preferred embodiment extends continuously from the conductive layer 26 to the corresponding first electrode 271, as illustrated in FIG. 6. To be specific, the first conductive portion 281 has one end disposed on the exposed portion 261 of the conductive layer 26. The first conductive portion 281 has the other end disposed on the first electrode 271. The first conductive portion 281 extends continuously from its one end to the other end, Like the first conductive portion 281, each second conductive portion 282 extends continuously from the conductive layer 26 to the corresponding second electrode 272, The conductive layer 26 and each electrode portion 27 are thus electrically connected together by the corresponding joint 28. It is noted that a silver paste, which can be formed easily and increase the flexibility of shape, is preferably used for the joints 28.

As illustrated in FIG. 2, each joint 28 in this preferred embodiment further includes a third conductive portion 283 electrically connecting the first conductive portion 281 and the second conductive portion 282 together on the conductive layer 26. That is, each joint 28 in this preferred embodiment has a U-shape in a top view, formed by the first conductive portion 281, second conductive portion 282 and third conductive portion 283. The conductive layer 26 and the electrode portions 27 can be thus electrically connected together by the joints 28 with more certainty.

The wire 70 connects the plurality of electrode portions 27 in series between its both ends, Between two of the electrode portions 27 adjacent to each other, the wire 70 connects together the first electrode 271 of one of the two electrode portions 27 and the second electrode 272 of the other electrode portion 27. As illustrated in FIG. 2, the wire 70 in this preferred embodiment has the following: a first wire 71 including one of its ends; a second wire 72 at least partly disposed between the plurality of electrode portions 27; a third wire 73 including the other end; and a fourth wire 74 connected to the grounding portion 41.

The first wire 71 connects together the first electrode 271 of the electrode portion 27 disposed at the one end in the X-axis direction and the first terminal 421 of the connector 42 of the circuit board 40. The second wire 72 connects together the second electrode 272 of one of the adjacent electrode portions 27 and the first electrode 271 of the other electrode portion 27. The third wire 73 connects together the second electrode 272 of the electrode portion 27 disposed at the other end in the X-axis direction and the second terminal 422 of the connector 42 of the circuit board 40. The fourth wire 74 connects the third wire 73 and the grounding portion 41 together. In this way, the wire 70 in this preferred embodiment has both ends connected to the respective first terminal 421 and second terminal 422, and the wire 70 is connected to the grounding portion 41.

Between two of the electrode portions 27 adjacent to each other, the wire 70 in this preferred embodiment is routed from the frame area NA up to the circuit board 40 and from the circuit board 40 back to the frame area NA, as illustrated in FIG. 2, To be specific, the second wire 72 is partly routed from the frame area. NA through the flexible boards 30 to the circuit board 40. The part of the second wire 72 routed to the circuit board 40 is placed on the circuit board 40 and is again routed back to the frame area NA through the flexible boards 30. That is, the second wire 72 is partly disposed on the flexible boards 30. Accordingly, the frame area NA can use a small space necessary for placing the wire 70. The frame area NA can consequently have enhanced flexibility for placing components other than the wire 70.

The liquid crystal panel 20 in this preferred embodiment operates in FFS mode using a fringe electric field, as described above. A conventional FFS-mode liquid crystal panel, which includes an array substrate provided with a common electrode and a pixel electrode, tends to accumulate electrical charges on the surface of its CF substrate. In some cases, the electrical charges accumulating on the surface of the CF substrate generate a vertical electrical field within the liquid crystal panel, thus disturbing the alignment of liquid crystal molecules within the liquid crystal layer, thus causing faulty display in the display device. In the display device 1 in this preferred embodiment by contrast, the conductive layer 26 on the surface of the CF substrate 22 is connected through the joints 28 to the grounded wire 70. Electrical charges are hence dissipated into the grounding portion 41 without accumulating in the CF substrate 22. This can prevent electrical charges from accumulating in the CF substrate 22, thereby avoiding faulty display in the display device 1.

The following describes inspecting the state of connection between the conductive layer 26 and each electrode portion 27 established by the corresponding joint 28 (hereinafter referred merely to as the state of connection). To effectively dissipate electrical charges accumulating in the CF substrate 22 into the grounding portion 41, the conductive layer 26 and the electrode portion 27 need to be well connected together by the joint 28. Such a state-of-connection inspection is performed by, for instance, measuring a resistance value between the wires 70. Such an inspection is also performed using, for instance, an inspection apparatus (not shown).

To be specific, this preferred embodiment provides a state-of-connection inspection that is performed by measuring a resistance value between the first terminal 421 and second terminal 422. The measured resistance value is lower than a reference value when the state of connection in each connected location is satisfactory. In contrast, the measured resistance value is higher than the reference value when any of the connected locations has a faulty connection. The state of connection can be thus inspected by comparing the measured resistance value to the reference value. As earlier described, the wire 70 of the display device 1 in this preferred embodiment connects the plurality of electrode portions 27 together in series. Even for multiple locations that are to be measured, the state of connection can be thus inspected by measuring a resistance value between two terminals, i.e., the first terminal 421 and second terminal 422.

In this preferred embodiment, the wire 70 has a lower degree of electrical resistivity than the conductive layer 26. To be specific, the conductive layer 26 in this preferred embodiment has several kilo Ωcm of electrical resistivity, whereas the wire 70 in this preferred embodiment has several hundred Ωcm of electrical resistivity. In this way, the electrical resistivity of the wire 70 is preferably set to be lower than the electrical resistivity of the conductive layer 26 by about one order of magnitude. This can increase the difference in resistance value between a satisfactory state of connection and a faulty state of connection. The state of connection can be consequently inspected with higher accuracy.

As earlier described, the first terminal 421 and second terminal 422 in this preferred embodiment are disposed in the connector 42 of the circuit board 40. The display device 1 in this preferred embodiment can hence undergo a state-of-connection inspection even after or before the bezel 50 is assembled to the liquid crystal panel 20. This can enhance the flexibility of inspection timing.

As described above, the display device 1 in this preferred embodiment includes the following: the first substrate 21 having the display area DA and the frame area NA disposed around the display area DA; the second substrate 22 facing the display area DA; the conductive layer 26 disposed on the second substrate 22 and remote from the first substrate 21; the plurality of electrode portions 27 disposed in the frame area NA; the plurality of joints 28 corresponding one-to-one to the plurality of electrode portions 27; and the wire 70 connecting, between both ends of the wire 70, the plurality of electrode portions 27 together in series. Each of the plurality of electrode portions 27 includes the first electrode 271 and the second electrode 272. Each of the plurality of joints 28 includes the first conductive portion 281 and the second conductive portion 282, The first conductive portion 281 electrically connects together the conductive layer 26 and the first electrode 271 of corresponding one of the plurality of electrode portions 27. The second conductive portion 282 electrically connects together the conductive layer 26 and the second electrode 272 of the corresponding electrode portion 27. Between two of the plurality of electrode portions 27 adjacent to each other, the wire 70 connects together the first electrode 271 of one of the two electrode portions 27 and the second electrode 272 of the other electrode portion 27. In the foregoing configuration, only two inspection terminals are required regardless of the number of inspection-target locations, in which the conductive layer 26 and each electrode portion 27 are connected together by the corresponding joint 28. That is, the configuration can prevent an increase in the number of terminals even if the number of inspection-target locations increases. This can prevent an increase in costs necessary for the inspection.

Second Preferred Embodiment

Figure 7:
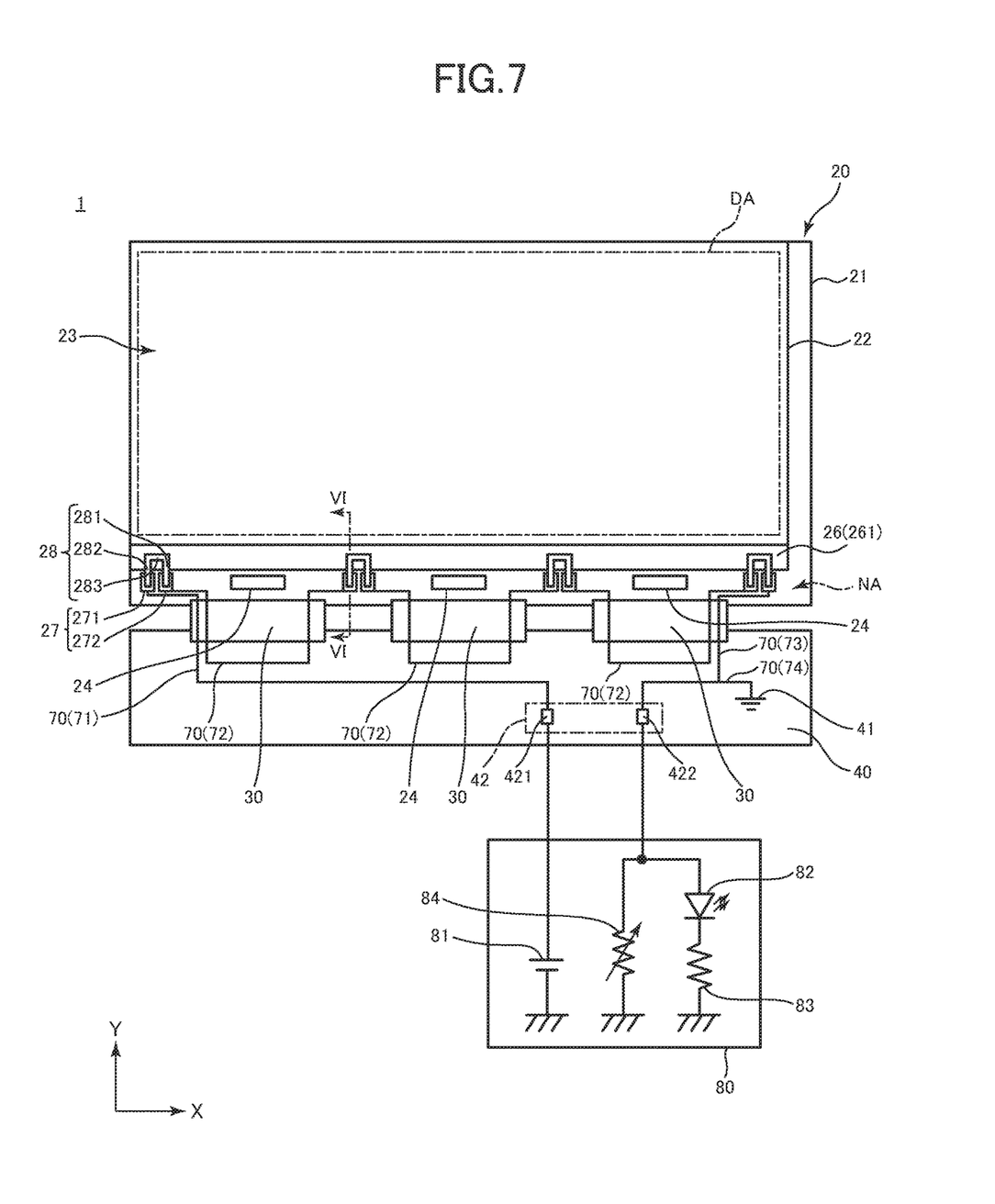
FIG. 7 is a top view of the configuration of how the display device and an inspection apparatus are connected together, according to a second preferred embodiment.
Figure 8:
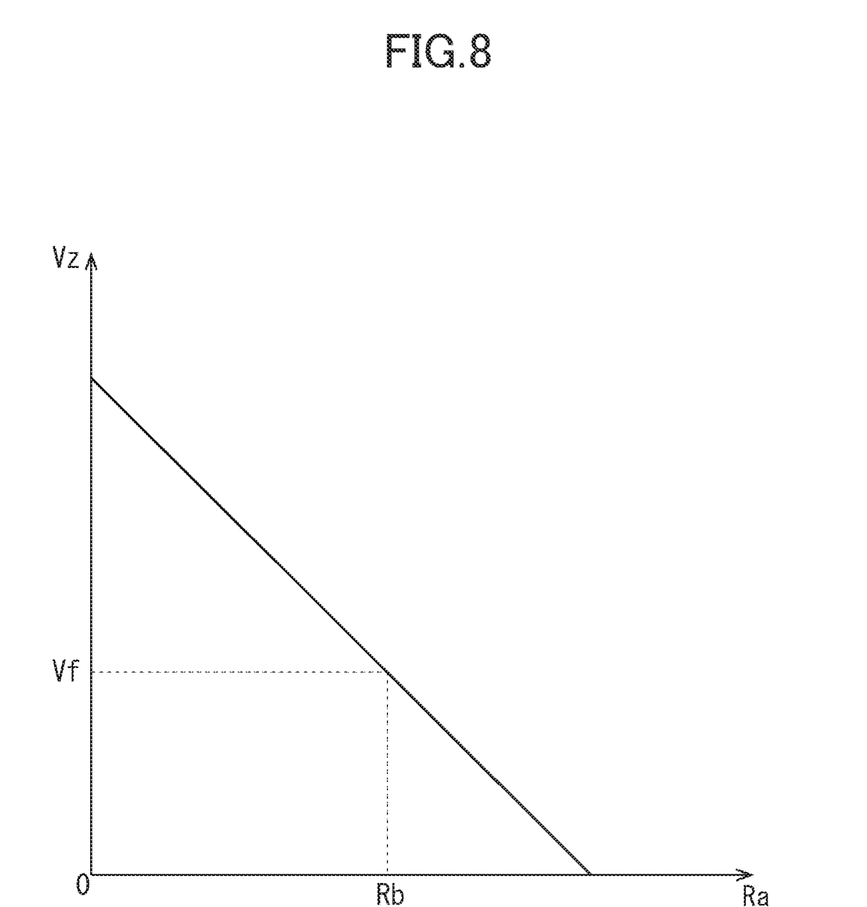
FIG. 8 is a graph illustrating the relationship between resistance measured by the inspection apparatus according to the second preferred embodiment and voltage applied to an inspection light source.

A second preferred embodiment, will be described. The following mainly describes differences between the first and second preferred embodiments, and their redundancies will not be described. The first and second preferred embodiments are different in how to inspect, the state of connection between the conductive layer 26 and each electrode portion 27, FIG. 7 is a top view of the configuration of how the display device 1 and an inspection apparatus 80 are connected together, according to this preferred embodiment, FIG. 8 is a graph illustrating the relationship between resistance measured by the inspection apparatus 80 according to this preferred embodiment and voltage applied to an inspection light source. As illustrated in FIG. 7, the method of inspecting the display device 1 according to this preferred embodiment uses the inspection apparatus 80.

The inspection apparatus 80 has the following: an inspection power source 81 connected to the first terminal 421; an inspection light source 82 connected to the second terminal 422; a protection resistor 83 connected in series to the inspection light source 82; and a variable resistor 84 connected in parallel to the inspection light source 82. The inspection apparatus 80 has an external connector (not shown) connected to the connector 42 of the circuit board 40. The external connector has a first inspection terminal (not shown) connected to the inspection power source 81, and a second inspection terminal (not shown) connected to the inspection light source 82, protection resistor 83 and variable resistor 84. The first inspection terminal is connected to the first terminal 421, and the second inspection terminal is connected to the second terminal 422.

The inspection power source 81 applies a predetermined DC voltage (e.g., about 5 V). The inspection light source 82 is composed of an LED for instance, and is lit upon application of a voltage equal to or greater than a predetermined threshold voltage Vf. The protection resistor 83 avoids the LED and other components from a breakage resulting from the passage of an excessive current through the inspection light source 82. The variable resistor 84 regulates its resistance Rs to an appropriate value.

FIG. 8 shows that in the inspection apparatus 80 in this preferred embodiment, a voltage Vz applied to the inspection light source 82 (hereinafter referred merely to as a voltage Vz) varies depending on a resistance value Ra between the first and second inspection terminals (hereinafter referred merely to as a resistance value Ra). The resistance value Ra is low in the absence of a faulty connection at a connected location relating to each joint 28 or the wire 70 and is high in the presence of such a faulty connection. The voltage Vz decreases at a predetermined changing rate (with linearity) along with increase of the resistance value Ra. The voltage Vz on the other hand increases at a predetermined changing rate along with decrease of the resistance value Ra. As such, the voltage Vz and the resistance value Ra are in inverse proportion. In addition, the resistance value Ra at which the voltage Vz is equal to the threshold voltage Vf is a reference value Rb, which is used for determining whether the state of connection is faulty.

The relationship between the resistance value Ra and voltage Vz changes depending on the resistance value (variable resistance value) Rs of the variable resistor 84 (hereinafter referred merely to as a resistance value Rs). That is, a larger resistance value Rs equals a larger reference value Rb, and conversely, a smaller resistance value Rs equals a smaller reference value Rb. Regulating the resistance value Rs can thus change the reference value Rb. For this reason, even a liquid crystal display having a liquid crystal panel of different screen size can undergo an inspection using the inspection apparatus 80 according to this preferred embodiment. That is, the inspection apparatus 80 in this preferred embodiment offers a convenient-to-use inspection, thus further reducing costs necessary for the inspection.

To be more specific, an inspection in this preferred embodiment requires, first, connecting the external connector, connected to the inspection apparatus 80, to the connector 42 of the circuit board 40, and connecting the first and second inspection terminals respectively to the first terminal 421 and second terminal 422.

Then, required is turning on the inspection power source 81. Accordingly, the voltage Vz is applied to the inspection light source 82. The inspection light source 82 at this time remains lit when the voltage Vz is equal to or greater than the threshold voltage Vf and remains unlit when the voltage Vz is less than the threshold voltage Vf. When the inspection light source 82 remains lit, the state of connection can be determined not to be faulty, because the resistance value Ra is equal to or smaller than the reference value Rb when the voltage Vz is equal to or greater than the threshold voltage Vf. When the inspection light source 82 remains unlit in contrast, a connected location can be determined to have a faulty connection, because the resistance value Ra is greater than the reference value Rb when the voltage Vz is less than the threshold voltage Vf. In this way, the lighting or non-lighting of the inspection light source 82 can facilitate an inspection of whether the state of connection is faulty.

As described above, the method of inspecting the display device 1 according to this preferred embodiment includes the following: measuring a resistance value between both ends of the wire 70; and in response to the resistance value that is equal to or greater than a predetermined value, determining that the joint 28 and the electrode portion 27 establish a faulty connection. This configuration offers an easy inspection.

The method of inspecting the display device 1 according to this preferred embodiment also includes connecting the inspection power source 81 to the first terminal 421, and connecting the inspection light source 82 to the second terminal 422. The inspection light source 82 is lit upon application of a voltage equal to or greater than a threshold voltage. The method also includes applying a voltage to the inspection power source 81 in such a manner that, for a resistance value between the first terminal 421 and second terminal 422 that exceeds a reference value, the voltage applied to the inspection light source 82 is less than the threshold voltage, and in such a manner that, for the resistance value that is equal to or smaller than the reference value, the voltage applied to the inspection light source 82 is equal to or greater than the threshold voltage. The method also includes connecting the variable resistor 84 in parallel to the inspection light source 82, and regulating a resistance value of the variable resistor 84 to change the reference value established for the resistance value. As such, regulating the resistance value of the variable resistor 84 can change the reference value established for the resistance value between the first terminal 421 and second terminal 422, connected to the inspection power source 81 and inspection light source 82. This offers an inspection conforming to a reference value established for a resistance value that can vary depending on conditions, such as the screen size of a liquid crystal panel.

Modifications

The present invention is not limited to the foregoing main preferred embodiments.

Figure 9:
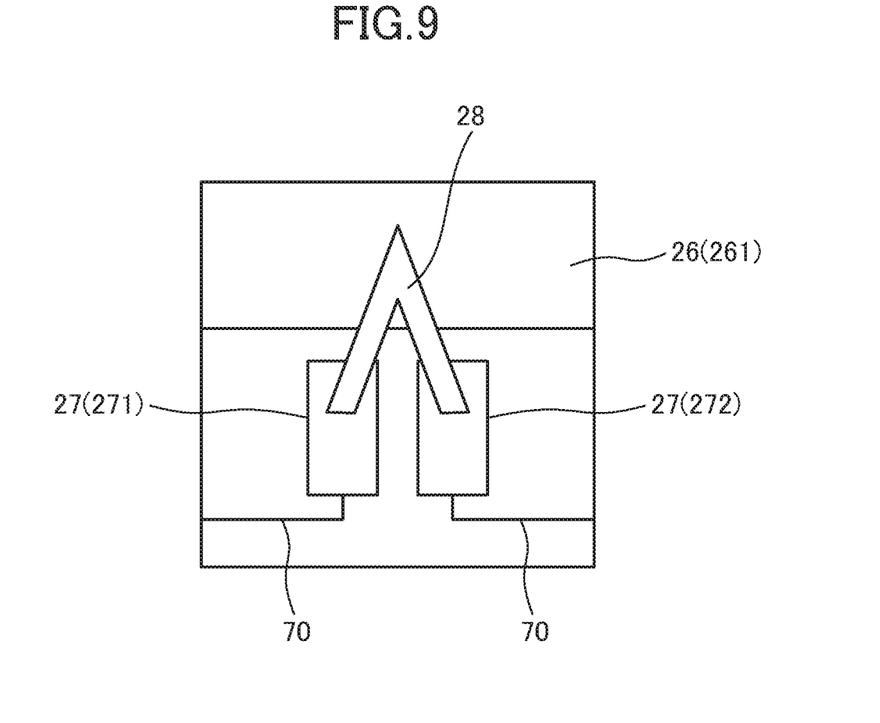
FIG. 9 is a schematic top view of the configuration of a joint according to a modification.
Figure 10:
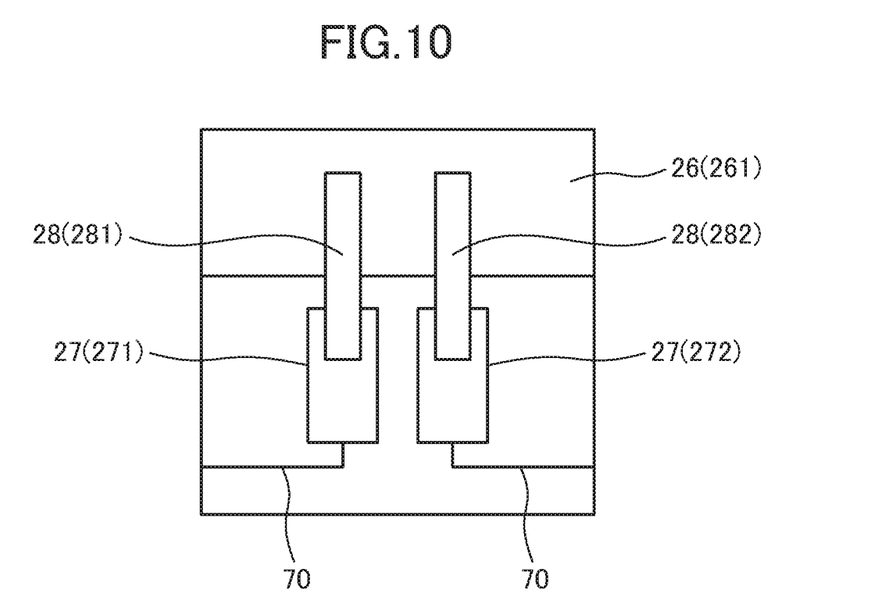
FIG. 10 is a schematic top view of the configuration of a joint according to a modification.

The foregoing preferred embodiments have described that each joint 28 has a U-shape in a in a top view, Each joint 28 of the disclosure may have any other shape, FIGS. 9 and 10 are schematic top views of the configuration of the joint 28 according to modifications. The joint 28 may have a V-shape in a top view, as illustrated in FIG. 9. Alternatively, the joint 28 may consist of only the first conductive portion 281 and second conductive portion 282, as illustrated in FIG. 10. Even such configurations enable the conductive layer 26 and electrode portion 27 to be connected together.

The foregoing preferred embodiments have described that the display device 1 undergoes an inspection using an inspection apparatus. However, the display device 1 may undergo an inspection using a tester for instance. The state of connection in this case is inspected by bringing a tester terminal into contact between the wires 70 to measure a resistance value. This offers a more simplified inspection. In addition, bringing the tester terminal into contact between the wires 70 disposed in the frame area. NA enables an inspection, thereby enabling a determination on whether there is a faulty connection to be made before the flexible boards 30 and the circuit board 40 are mounted onto the liquid crystal panel 20.

The foregoing preferred embodiments have described that four electrode portions 27 are provided. The foregoing preferred embodiments have also described that each of the four electrode portions 27 is connected to the conductive layer 26 by the corresponding joint 28. That is, in the foregoing preferred embodiments, there are four locations where the joint 28 connects the conductive layer 26 and the electrode portion 27 together. However, there may be three or less connected locations, or there may be five or more connected locations. Even for such fluctuations in the number of connected locations (inspection-target locations), an inspection can be performed using only two terminals, i.e., the first terminal 421 and the second terminal 422. As a result, even for such fluctuations in the number of connected locations, the same connector 42 can be used without the need for changing the type of the connector 42, In addition, even for an increased number of connected locations, an increase in the number of terminals necessary for the inspection can be prevented. This can prevent an increase in costs necessary for the inspection.

The foregoing preferred embodiments have described that the liquid crystal panel 20 operates in FFS mode using a fringe electric field. However, the liquid crystal panel 20 may operate in another mode, such as in-plane-switching (IPS) mode using a transverse electric field. In addition, the display panel may be an organic-light-emitting-diode (MED) panel or a quantum-dot-light-emitting-diode (QLED) panel. Such display panels can prevent faulty display caused by electrical charges accumulating in the CF substrate. In addition, even for an increased number of inspection-target locations in the foregoing inspection, such display panels can prevent an increase in costs necessary for the inspection.

The components described in the foregoing preferred embodiments and modifications may be combined as appropriate, unless otherwise contradicted.

While there have been described, what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a first substrate having a display area and a frame area disposed around the display area;
a second substrate facing the display area;
a conductive layer disposed on the second substrate and remote from the first substrate;
a plurality of electrode portions disposed in the frame area;
a plurality of joints corresponding one-to-one to the plurality of electrode portions; and
a wire connecting, between both of ends of the wire, the plurality of electrode portions together in series,
wherein each of the plurality of electrode portions includes a first electrode and a second electrode,
each of the plurality of joints includes a first conductive portion and a second conductive portion, the first conductive portion electrically connecting together the conductive layer and the first electrode of corresponding one of the plurality of electrode portions, the second conductive portion electrically connecting together the conductive layer and the second electrode of the corresponding electrode portion, and
between two of the plurality of electrode portions adjacent to each other, the wire connects together the first electrode of one of the two electrode portions and the second electrode of another of the two electrode portions.

2. The display device according to claim 1, wherein the wire has a lower degree of electrical resistivity than the conductive layer.

3. The display device according to claim 1, wherein the first conductive portion and the second conductive portion are made of a conductive material,
the first conductive portion continuously extends from the conductive layer to the first electrode, and
the second conductive portion continuously extends from the conductive layer to the second electrode.

4. The display device according to claim 3, wherein each of the plurality of joints is made of the conductive material, and
each of the plurality of joints further includes a third conductive portion electrically connecting the first and second conductive portions together on the conductive layer.

5. The display device according to claim 4, wherein each of the plurality of joints has all-shape in a top view.

6. The display device according to claim 1, further comprising
a liquid crystal layer disposed between the first substrate and the second substrate.

7. The display device according to claim 1, further comprising
a circuit board connected to the first substrate, the circuit board having a grounding portion and a terminal portion including first and second terminals,
wherein the wire is connected to the first terminal and the second terminal at both of the respective ends and is connected to the grounding portion.

8. The display device according to claim 7, further comprising
a flexible board flexible and connecting together the first substrate and the circuit board,
wherein the wire includes a wire disposed on the flexible board, and the wire disposed on the first substrate and the circuit board is connected via the wire disposed on the flexible board.

9. The display device according to claim 7, wherein between two of the plurality of electrode portions adjacent to each other, the wire is routed from the frame area up to the circuit board and from the circuit board back to the frame area.

10. A method of inspecting the display device according to claim 1, the method comprising:
measuring a resistance value between both of the ends of the wire; and
in response to the resistance value that is equal to or greater than a predetermined value, determining that one of the plurality of joints and corresponding one of the plurality of electrode portions establish a faulty connection.

11. A method of inspecting the display device according to claim 7, the method comprising:
connecting an inspection power source to the first terminal;
connecting, to the second terminal, an inspection light source that is lit upon application of a voltage equal to or greater than a threshold voltage; and
applying a voltage to the inspection power source in such a manner that, for a resistance value between the first and second terminals that exceeds a reference value, the voltage applied to the inspection light source is less than the threshold voltage, and in such a manner that, for the resistance value that is equal to or smaller than the reference value, the voltage applied to the inspection light source is equal to or greater than the threshold voltage.

12. The method according to claim 11, comprising:
connecting a variable resistor in parallel to the inspection light source; and
regulating a resistance value of the variable resistor to change the reference value established for the resistance value.

* * * * *